US005629092A

United States Patent [19]

Gay et al.

[11] Patent Number: 5,629,092

[45] Date of Patent: *May 13, 1997

[54] LUBRICOUS ENCAPSULATED FERROMAGNETIC PARTICLES

[75] Inventors: David E. Gay, Noblesville, Ind.; Howard H.-D. Lee, Bloomfield Hills, Mich.

[73] Assignee: General Motors Corporation, Detroit, Mich.

[ * ] Notice: The term of this patent shall not extend beyond the expiration date of Pat. No. 5,567,746.

[21] Appl. No.: 357,890

[22] Filed: Dec. 16, 1994

[51] Int. Cl.$^6$ .................... B32B 5/16

[52] U.S. Cl. .................... 428/407; 252/62.51 R; 252/62.54; 428/900

[58] Field of Search .................... 428/403, 407, 428/480, 500, 413, 414, 421, 422, 447, 448, 450, 458, 473.5, 474.4, 475.2, 900; 148/300, 301, 302, 306; 252/62.51, 62.54

[56] References Cited

U.S. PATENT DOCUMENTS

| | | | |
|---|---|---|---|
| 3,725,521 | 4/1973 | Ebling | 264/104 |
| 4,601,765 | 7/1986 | Soileau et al. | 148/104 |
| 4,696,725 | 9/1987 | Ochiai et al. | 252/62.54 |
| 4,865,915 | 9/1989 | Okonogi et al. | 428/336 |
| 5,069,972 | 12/1991 | Versic | 428/407 |
| 5,198,137 | 3/1993 | Rutz et al. | 252/62.54 |
| 5,211,896 | 5/1993 | Ward et al. | 264/126 |
| 5,225,459 | 7/1993 | Oliver et al. | 523/220 |
| 5,271,891 | 12/1993 | Gay et al. | 419/36 |
| 5,272,008 | 12/1993 | Shain et al. | 428/407 |
| 5,395,695 | 3/1995 | Shain et al. | 428/407 |

FOREIGN PATENT DOCUMENTS 2241701 11/1991 United Kingdom .

OTHER PUBLICATIONS

Patent Abstracts of Japan vol. 016 No. 285 (E-1222), 24 Jun. 1992 & JP-A-04 071205 (Tokin Corp) 5 Mar. 1992, *abstract*.

*Primary Examiner*—Hoa T. Le
*Attorney, Agent, or Firm*—Lawrence B. Plant

[57] ABSTRACT

A mass of ferromagnetic particles having a lubricous shell comprising a plurality of organic lubricant particles embedded in a film of a thermoplastic binder.

25 Claims, 2 Drawing Sheets

LUBRICOUS ENCAPSULATED FERROMAGNETIC PARTICLES

This invention relates to a mass of ferromagnetic particles each encapsulated in a polymeric shell embedding a plurality of organic lubricant particles.

BACKGROUND OF THE INVENTION

It is known to compression mold hard (i.e., permanent) magnets, as well as soft (i.e., temporary) magnetic cores for electromagnetic devices (e.g., transformers, inductors, motors, generators, relays, etc.) from a plurality of ferromagnetic particles each encapsulated in a thermoplastic or thermosetting polymeric shell.

Soft magnetic cores are molded from ferromagnetic particles (i.e., less than about 1000 microns) such as iron, and certain silicon, aluminum, nickel, cobalt, etc., alloys thereof (hereafter generally referred to as iron), and serve to concentrate the magnetic flux induced therein from an external source (e.g., current flowing through an electrical coil wrapped thereabout). Unlike hard magnets, such cores, once magnetized, are very easily demagnetized, i.e., require only a slight coercive force (i.e., less than about 200 Oersteds) to remove the resultant magnetism. Ward et al. U.S. Pat. No. 5,211,896, for example, discloses one such soft magnetic core forming material wherein the polymeric shell comprises a thermoplastic polyetherimide, polyamideimide or polyethersulfone which, following molding, fuses together to (1) form a polymer matrix embedding the iron particles, and (2) so electrically insulate each iron particle from the next as to significantly reduce eddy current losses and hence total core losses (i.e., eddy current and hysteresis losses) in AC applications. Other possible matrix-forming thermoplastic polymers for this purpose are the polycarbonates and polyphenylene ethers among others known to those skilled in the art.

Permanent (i.e., hard) magnets are also known to be compression molded from such ferromagnetic particles as magnetic ferrites, rare-earth metal alloys (e.g., Sm—Co, Fe—Nd—B, etc.), and the like, and are subsequently permanently magnetized. Shain et al. U.S. Pat. No. 5,272,008, for example, discloses one such hard magnet-forming material comprising iron-neodymiumboron particles encapsulated in a composite polymeric shell comprising a thermosetting, matrix-forming, epoxy underlayer overcoated with a thermoplastic polystyrene outer layer. The polystyrene keeps the epoxy coated particles from sticking together before the epoxy is cured.

In Ward et al. U.S. Pat. No. 5,211,896 and Shain et al. U.S. Pat. No. 5,272,088, the shell-forming polymers are dissolved in an appropriate solvent, and a fluidized stream of the ferromagnetic particles spray-coated with the solution, using the co-called "Wurster" process. Wurster-type spray-coating equipment comprises a cylindrical outer vessel having a perforated floor through which a heated gas passes upwardly to heat and fluidize a batch of ferromagnetic particles therein. A concentric, open-ended, inner cylinder is suspended above the center of the perforated floor of the outer vessel. A spray nozzle centered beneath the inner cylinder sprays a solution of the shell-forming polymer, dissolved in a solvent, upwardly into the inner cylinder (i.e., the coating zone) as the fluidized ferromagnetic particles pass upwardly through the spray in the inner cylinder. The particles circulate upwardly through the center of the inner cylinder and downwardly between the inner and outer cylinders. The gas (e.g., air) that fluidizes the metal particles also serves to vaporize the solvent causing the dissolved shell-forming polymer to deposit as a film onto each particle's surface. After repeated passes through the coating zone in the inner cylinder, a sufficient thickness of polymer accumulates over the entire surface of each particle as to completely encapsulate such particle.

Rutz et al U.S. Pat. No. 5,198,137 mechanically blends or mixes boron nitride lubricant particles with polymer encapsulated particles prior to molding the particles into finished products to improve the flowability of the powder and the magnetic permeability of the molding, as well as to reduce the stripping and sliding die ejection pressures. Moreover, ethylene bisstearateamide lubricant particles—sold commercially under the trade name ACRAWAX™), have heretofore been mixed/blended with polymer-encapsulated metal particles. Mechanical blending or mixing of the lubricant particles with the encapsulated particles, however, (1) can damage the polymer shell covering each of the metal particles, (2) does not uniformly distribute the lubricant particles throughout the particle mass, (3) results in a mass of loose particles having different densities and particle sizes, and a consequent propensity for segregation, and (4) adds additional cost to the preparation of the material.

SUMMARY OF THE INVENTION

This invention provides a mass of ferromagnetic particles (i.e., magnetically soft or hard) each of which is encapsulated in a lubricous polymeric shell. The lubricous shell comprises a minority amount of a plurality of substantially insoluble, organic, lubricant particles embedded in a substantially continuous film of a soluble thermoplastic binder. The organic lubricants do not damage, or interfere with, the ability of the shell-forming polymer to isolate and/or insulate the ferromagnetic particles from each other. By "minority" amount is meant less than 50% by weight. By "substantially insoluble" is meant either not soluble in, or only so slightly soluble in, the solvent for the binder that there is an insufficient amount of solute produced from the lubricant particles to effectively function as a binder for the insoluble portion thereof. By "organic" is meant carbon-based compounds. Because the lubricant particles are attached to and cover each ferromagnetic particle, the lubricant is distributed substantially uniformly throughout the particle mass along with the ferromagnetic particles that carry them, are not susceptible to subsequent segregation, and improve the dry particle flowability and hot compactability of the encapsulated particles. While the shell may comprise a single layer, it will preferably comprise at least two layers, i.e., a matrix-forming underlayer, or base coat, and a lubricous overlayer, or topcoat. Moldings made from particles having two layer shells have demonstrated higher densities and higher resistivities than the monolayer shells. The polymer used for the matrix-forming layer as well as the binder for the lubricant in the over layer (e.g., topcoat) may be the same or different. Preferably however, the layers will be comprised of an underlayer of one polymer, and an overlayer of a different polymer which results in more effective interparticle insulation even in the face of extensive deformation of the ferromagnetic particles during compression molding. In a most preferred embodiment, the overlayer will have a lower melt flow temperature than the underlayer for best densification without loss of interparticle insulation. One measure of such effectiveness is the electrical resistivity of moldings made from the particles. High resistivities correspond to better interparticle insulation, and corresponding reduced core losses in high frequency AC (i.e., alternating current) soft magnetic core applications. The organic lubricant particles will most preferably be concentrated in the outermost layer of the shell, i.e., near the surface of the encapsulated particles where they are the most effective.

A preferred mass of moldable, permanently magnetizable particles comprises iron-neodymium-boron particles each encapsulated in an epoxy underlayer topcoated with ethylene bisstearateamide (i.e., ACRAWAX™) lubricant particles embedded in a substantially continuous film of polystyrene binder. At lubricant loadings of less than about 0.2% by weight, such particles have better dry flowability, and yield higher density moldings than similar particles which do not have such a topcoat. Above about 0.2 weight % ACRAWAX™, flowability remains good, but the density begins to fall off as a result of the increased organic content of the molded mass. Lubricant loadings of about 0.3 are preferred with loadings above about 0.5 percent providing insufficient benefits to offset the loss in density.

A preferred mass of moldable, soft magnetic core-forming particles comprises iron particles encapsulated in a polyetherimide (i.e., ULTEM™) underlayer topcoated with polytetrafluoroethylene [PTFE] (i.e., Teflon™) lubricant particles embedded in a substantially continuous film of thermoplastic polyacrylate (i.e., ACRYLOID B-66™ from Rohm & Haas) binder. Such PTFE coated particles have better dry flowability, and yield higher density moldings having higher resistivities than similar particles made without such a topcoat, or made by simply mechanically mixing/blending the ferromagnetic particles with the PTFE. PTFE loadings between about 0.05 percent by weight and about 0.5 percent by weight are effective with about 0.1 percent to about 0.3 percent being preferred to provide the desired benefits without adversely affecting density of the molding.

The lubricous shell may be formed on the ferromagnetic particles by simply stirring the ferromagnetic particles into a slurry of the lubricant particles suspended in a solution of the a film-forming binder therefor and then removing the solvent (e.g., by vaporization). Preferably however, the lubricants are deposited onto the ferromagnetic particles using a fluidized stream type method (e.g., Wurster process) of spray-coating, wherein a slurry comprising a suspension of the lubricant particles in a solution of the binder polymer is sprayed into a fluidized stream of the ferromagnetic particles, and the solvent evaporated so as to leave the lubricant particles embedded in, and dispersed throughout, the binder polymer which coats the ferromagnetic particles. More specifically, a carrier solution is prepared comprising a soluble, thermoplastic, film-forming polymer binder dissolved in a suitable solvent. A plurality of small lubricant particles are suspended in the binder solution so as to provide a sprayable slurry. The mean size of the lubricant particles is much smaller than the mean size of the ferromagnetic particles, but is preferably larger than the thickness of the binder polymer film layer that holds them to the surface of the larger ferromagnetic particles. The ferromagnetic particles are then fluidized in a gas stream (e.g., in a Wurster coater), and spray-coated with the slurry so as to coat the surfaces of each of the ferromagnetic particles with the slurry. Subsequent evaporation of the solvent from the binder solution leaves the lubricant particles embedded in the soluble thermoplastic polymer binder. With the solvent removed, the lubricant-coated ferromagnetic particles are free-flowing, and each carries with it its own lubricant and matrix-forming polymer. As a result, the lubricant particles are distributed substantially evenly throughout the particle mass, along with the ferromagnetic particles that carry them, and are not susceptible to segregation or separation therefrom during handling/processing. Moreover, the lubricant is located on the exterior surfaces of the ferromagnetic particles precisely where it is needed most to improve the dry flowability of the particles, and enhance the hot compressibility of the particles so as to promote the densification of the particles to a degree heretofore unachievable with lubricants which were merely mechanically mixed/blended into the ferromagnetic particle mass. Finally, the particles are placed in a mold, and compressed under sufficient pressure (i.e., with or without heating depending on the composition of the matrix-forming layer) to cause the shells of the several particles to fuse, or otherwise bond (e.g., cross-link), together to form a finished molding having the ferromagnetic particles distributed substantially uniformly throughout, i.e., each separated from the next by matrix polymer rather than being clustered together in small clusters of uncoated particles which is characteristic of moldings made from mechanically blended particle masses.

DETAILED DESCRIPTION OF THE INVENTION

Figure 1:
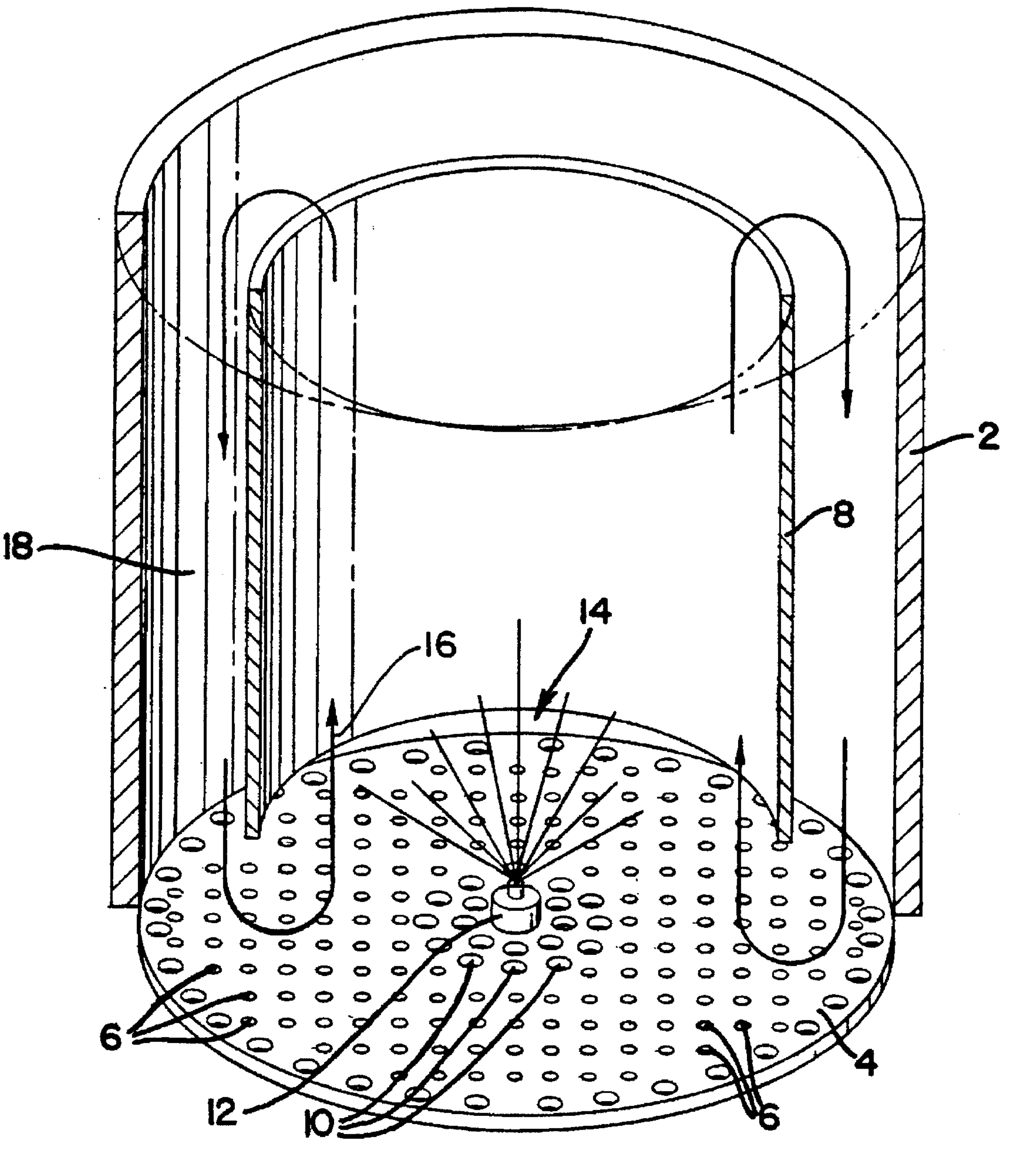
FIG. 1 illustrates, in a sectioned perspective view, a Wurster-type fluidized stream coater.

Ferromagnetic particles are each encapsulated in a lubricous polymeric shell comprising a minority amount (i.e., less than about 50% by weight) of a plurality of insoluble, organic, lubricant particles embedded in a substantially continuous film of a soluble thermoplastic binder. The shell may comprise one or more polymer layers. Preferably, the shell will comprise more than one layer, and the lubricant particles will be concentrated in the outermost layer. While any technique that coats each of the ferromagnetic particles with a lubricant particle-bearing polymer layer is acceptable, the layer(s) is (are) preferably formed by spray-coating fluidized ferromagnetic particles with a slurry of the lubricant particles suspended in a solution of a soluble thermoplastic binder. The solvent for the binder is substantially a nonsolvent for the lubricant particles at the coating conditions and is removed following coating leaving the lubricant particles embedded in the binder polymer which is left clinging to the surface of each of the ferromagnetic particles. The spray coating technique insures that each and every ferromagnetic particle is coated and thereby avoids clumping or clustering of both the ferromagnetic and the lubricant particles and a resultant non homogeneous mass, as well as avoid subsequent segregation of the lubricant and ferromagnetic particles.

The lubricant particles will preferably be concentrated near the outermost surface of the shell where they can more effectively function as interparticle lubricants, and thereby promote better flowability and optimize densification of products hot molded from the particles. Hence when the shell comprises multiple polymer layers, the lubricant-binder layer will most preferably comprise the outermost layer (i.e., a topcoat). The amount of lubricant particles will vary with the application (i.e., hard or soft magnet), the composition of the lubricant, and the composition of the matrix and binder layers. Generally, the lubricant particles will comprise about 0.05% by weight to about 0.5% by weight of the encapsulated ferromagnetic particles, about 5% to 50% by weight of the shell, and about 25% to about 75% by weight of the lubricant-binder layer of multi-layer shells depending on the nature of the product being molded and the composition of the lubricant. For Fe—Nd—B hard magnetic particles using styrene-bound ACRAWAX™ as a top layer over an epoxy underlayer, no more ACRAWAX™ than about 0.3% by weight of the entire mass is needed to provide good dry particle flowability and densification on molding. Excellent flowability is attainable at higher ACRAWAX™ loadings, but density drops. Similarly, in soft magnetic iron particles having a polyetherimide underlayer covered by an acrylate-bound polytetrafluoroethylene lubricous topcoat, no more than about 0.5% PTFE is needed to maximize particle flowability, and provide increased density and electrical resistivity upon molding. More than about 0.5% PTFE results in lower density and weaker moldings which may be undesirable in some, but not all, applications. Accordingly, lubricant content should be minimized consistent with the needs of the product and the process for making same. ACRAWAX™ loadings of about 0.3 percent by weight and PTFE loadings of about 0.1 percent to about 0.3 percent are preferred for their respective permanent magnet and soft magnetic core applications.

The ferromagnetic particles will have an average particle size between about 5 microns and about 500 microns, depending on the nature of the particles, with an average particle size of about 100–120 microns. Preferred iron particles are commercially available from the Hoeganaes Company as grade 1000C (average 100 micron), or SC 40 (average 180 microns). Similarly, ferrites suitable for making hard magnets will range in size from about 1 micron to about 100 microns with an average size of about 20 microns to about 60 microns. Likewise, rare-earth ferromagnetic particles (e.g., Sm—Co, or Fe—Nd—B) for making hard magnets will range in size from about 10 microns to about 300 microns with an average particle size of about 100 microns.

The lubricant particles clinging to the surface of the ferromagnetic particles will be much smaller than the ferromagnetic particles that support and carry them so that a significant number of them can readily coat the ferromagnetic particle. The mean lubricant particle size will vary with the particular lubricant chosen, but will generally vary from about 1 micron to about 15 microns.

The amount of soluble thermoplastic polymer used as a binder to embed and bind the lubricant particles to the surface of the ferromagnetic polymers can vary significantly depending on the composition of such thermoplastic, and whether or not the encapsulating shell is to comprise one or more layers. In this regard, if, as in a monolayer shell, the thermoplastic binder for the lubricant particles also serves as the primary matrix-forming polymer for the ferromagnetic particles in the molded product, a greater quantity of thermoplastic binder is needed than if the shell were to comprise a first underlayer of one polymer (i.e., the matrix-forming polymer), and a second binder polymer overlayer which serves to glue the lubricant particles atop the matrix-forming polymer layer and supplement the interparticle insulation provided by the matrix-forming polymer layer. Preferably, in multi-layer shells the mean diameter of the lubricant particles will be greater than the thickness of the binder polymer which glues the lubricants to the ferromagnetic particles.

For soft magnetic particles, the matrix-forming polymer and the thermoplastic, polymeric binder for the lubricant particles may be the same material. In such a situation, the solution of the matrix-forming polymer will preferably be spray-coated continuously onto the fluidized ferromagnetic particles. Initially however, the spraying solution will contain no lubricant particles, and will be used to simply build up a lubricant-free layer on each of the particles. After a sufficiently thick lubricant-free layer is formed, the organic lubricant particles are added to, and mixed with, the remaining supply of matrix-forming polymer solution and the slurry pumped to the spray nozzle used to complete the shell-forming coating operation and to deposit a lubricant-rich outermost layer atop the underlying lubricant-free polymer layer. Preferably, however, the lubricant-rich outer layer will comprise a thermoplastic binder polymer which is different from the matrix-forming polymer underlayer so that a multi-layer shell is formed which is a composite of at least two different polymers plus the lubricant particles. It has been found, for example, that iron particles having a first, particle-free, matrix-forming polymer underlayer comprising polyetherimide (i.e., ULTEM™ from the General Electric Company) overcoated with a slurry of polytetrafluoroethylene (PTFE) particles (i.e., DuPont's TEFLON™) in a solution of methylmethacrylate-butyl methacrylate polymer (i.e., ACRYLOID B-66™ from the Rohm & Haas Company dissolved in acetone produces moldings hot pressed at 60 tons per square inch which have higher densities (i.e., 7.5–7.6 g/cc), and higher electrical resistivities (i.e., 1.0–3.0 Ω-cm) than moldings made from particles encapsulated any other way. Indeed, such moldings approach the theoretical density of 7.613 g/cc of moldings made from iron particles bound together with 0.5% by weight ULTEM™. The electrical resistivity is a convenient measure of the degree of inter-particle electrical insulation achieved by the polymer system comprising the shell. High resistivity and high density moldings make the best soft magnetic cores for high frequency AC applications as they provide both high magnetic permeability (attributable to higher density) and low core losses (attributable to good interparticle insulation). When depositing two different polymers to form a multi-layer shell, it seems to be desirable that the solvent for the binder polymer is not also a solvent for the underlayer polymer. If the solvent for the binder layer is also a solvent for the underlayer, erosion of the underlying layer can occur and the overlayer may adhere too strongly to the underlayer for optimal flow during molding. Finally, it is preferable that the polymer comprising the topcoat have a lower melt flow temperature than the undercoat which also seems to permit densification without loss of interparticle insulation.

After coating, the encapsulated particles are compression molded to the desired shape using sufficient temperature and pressure to cause the matrix-forming polymer component of the shell to fuse (e.g., for a thermoplastic), or otherwise bond (e.g., cross-link for a thermoset), together and completely embed the ferromagnetic particles therein. Molding pressures will typically vary from about 50 tons per square inch to about 60 tons per square inch. The molding temperature will depend on the composition of the matrix-forming polymer (i.e., the underlayer).

The lubricant particles on the surfaces of the ferromagnetic particles promote better dry flowability and densification of the encapsulated particles apparently by reducing interparticle friction. Moreover, polymer-bound fluorocarbon (e.g., PTFE) topcoats have produced, tenfold improvements in the electrical resistivity of soft magnetic cores as compared to similarly made cores which did not have such a binder-fluorocarbon topcoat.

For permanent magnets, the ferromagnetic particles comprise permanently magnetizable materials such as ferrites, rare-earth magnet alloys, or the like, having an average particle size about 20 microns and 100 microns (e.g., 100 microns for FeNdB particles), and the shell will preferably comprise two distinct layers. The first or underlayer: (1) comprises the matrix-forming polymer; (2) is deposited as a discrete first layer directly atop the ferromagnetic particles; and (3) preferably comprises polyamides such as Nylon 11, Nylon 6 and Nylon 612, or epoxies such as NOVELAC by Shell Chemical Co. However, other polymers such as polyvinylidine difluoride (PVDF), may also be used. The second or overlayer will preferably comprise polystyrene, though other soluble thermoplastics such as polycarbonate, polysulfone, or polyacrylates may be used in the alternative. The lubricant particles to be included in the overlayer preferably comprise lubricous organic stearates having an average particle size between about 1 micron and 15 microns. The lubricant particles and will most preferably comprise ethylene bisstearateamide particles (e.g., ACRAWAX™). Fluorocarbon lubricants (e.g., PTFE) may be used in lieu of the stearate or ACRAWAX™. The insoluble lubricant particles are suspended in a carrier solution of a soluble thermoplastic polymer to form a slurry suitable for coating each of the magnetic particles. The carrier solution for the insoluble lubricant particles preferably comprises polystyrene dissolved either in toluene, or N-methyl-pyrrolidone. However, any of the aforesaid other soluble thermoplastics may also be used in conjunction with suitable solvents therefor such as methylene chloride or acetone, as appropriate to the particular soluble polymer and the underlayer. For such permanently magnetizable particles, the polymer shell will preferably comprise about 1.15% to about 4.25% by weight of the encapsulated magnetic particle. The stearate lubricant will comprise about 8% to about 12% by weight of the shell, and about 25% to about 40% by weight of the lubricant-binder-outer layer of the shell.

For soft magnetic cores (e.g., iron ferromagnetic particles), the matrix-forming polymer will comprise thermoplastic polyetherimides (preferred) polyamideimides, polysulfones, polycarbonates, polyphenylene ethers, polyphenylene oxide, polyacyclic acid, poly (vinylpyrrolidone), and poly(styrene maleic anhydride). For such soft magnetic cores, the binder for the lubricant particles may be the same as, or different than, the matrix-forming polymer. Hence the binder may comprise the aforementioned matrix-forming polymers, or such different thermoplastic polymers as polystyrene, silicones, or polyacrylates (preferred). The lubricant particles will preferably comprise lubricous fluorocarbons, and most preferably polytetrafluoroethylene (PTFE). The thermoplastic binder polymer is dissolved in a suitable solvent such as methylene chloride or any of a variety of solvents such as ethanol, toluene, acetone, or N-methylpyrridone, as appropriate to the particular soluble polymer. For molding soft magnetic cores, the shells on the ferromagnetic particles will preferably comprise about 0.25% to about 2.5% by weight of the encapsulated iron particles (preferably about 0.4% to about 0.8%). The PTFE lubricant particles will comprise: (1) about 0.05% to about 0.5% by weight of the encapsulated iron particles; (2) about 12% to about 20% by weight of the shell; and (3) about 25% to about 50% by weight of the binder-lubricant layer (i.e., for multi-layer shells). A most preferred combination comprises iron particles having a first lubricant-free underlayer comprising polyetherimide (i.e., ULTEM™ from the General Electric Co.) topcoated with a layer of polytetrafluoroethylene (PTFE) particles embedded in a methyl methacrylate-butyl methacrylate polymer binder (i.e., ACRYLOID B-66 from Rohm & Haas). When molded at 60 tons/in.$^2$, such polyacrylate-bound-PTFE lubricated ferromagnetic particles yielded moldings having higher densities (i.e., as high as 7.629 g/cc), and higher electrical resistivities (i.e., as high as 1.3 ohm-cm) than with any other binder-lubricant combination tested. This resistivity is almost ten time (10x) the resistivity of other binder-lubricant combinations tested. This combination of materials resulted in unusually high magnetic permeability (i.e., 40 GOe at 150 oersted field) and low eddy current loss (i.e., 50 J/m$^3$@50 Hz frequency) in particle samples having a total polymer content (i.e., matrix, binder and lubricant) of about 0.5 percent. Alternatively, other lubricous fluorocarbons may be substituted for the PTFE such as (1) perfluoroalkoxyethylene, (2) hexafluoropropylene, (3) trifluoroethylene chloride, (4) a copolymer of trifluoroethylene chloride and ethylene, (5) a copolymer of tetrafluoroethylene and ethylene, (6) fluorinated vinylidene, (7) fluorinated vinyl polymers, etc.

To deposit the lubricant particles onto the surface of the ferromagnetic particles, the lubricant particles are suspended in the binder solution to form a slurry thereof, and preferably spray-coated onto a fluidized stream of the iron particles in a Wurster-type apparatus schematically illustrated in FIG. 1. Essentially, the Wurster-type apparatus comprises an outer cylindrical vessel 2 having a floor 4 with a plurality of perforations 6 therein, and an inner cylinder 8 concentric with the outer vessel 2 and suspended over the floor 4. The perforations 10 and 20 at the center of the floor 4 and at the periphery of the plate 4 respectively are larger than those lying therebetween. A spray nozzle 12 is centered in the floor 4 beneath the inner cylinder 8, and directs a spray 14 of the lubricant-binder slurry to be coated into the coating zone within the inner cylinder 8. The iron particles (not shown) to be encapsulated are placed atop the floor 4, and the vessel 2 closed. Sufficient warm air is pumped through the perforations 6 in the floor 4 to fluidize the particles and cause them to circulate within the coater in the direction shown by the arrows 16. In this regard, the larger apertures 10 in the center of the floor allow a larger volume of air to flow upwardly through the inner cylinder 8 than in the annular zone 18 between the inner and outer cylinders 8 and 2, respectively. As the particles exit the top of the inner cylinder 8 and enter the larger cylinder 2, they decelerate and move radially outwardly and fall back down through the annular zone 18. The large apertures 20 adjacent the outer vessel provide more air along the inside face of the outer wall of the outer vessel 2 which keeps the particles from statically clinging to the outer wall as well as provides a transition cushion for the particles making the bend into the center cylinder 8.

During startup, the particles are circulated, in the absence of any coating spray, until they are heated to the desired coating temperature by the heated air passing through the floor 4. After the particles have been thusly preheated, the desired lubricant slurry is pumped into the spray nozzle 12 where a stream of air sprays it upwardly into the circulating bed of particles, and the process continued until the desired amount of lubricant and binder have been deposited onto the ferromagnetic particles. Sonic or ultrasonic vibrations or the like may be applied to the plumbing conducting the slurry to the nozzle from the mixing tank to keep the lubricant particles in suspension all the way to the nozzle 12. The amount of air needed to fluidize the ferromagnetic particles varies with the batch size of the particles, the precise size and distribution of the perforations in the floor 4, and the height of the inner cylinder 8 above the floor 4. Air flow is adjusted so that the bed of particles becomes fluidized and circulates within the coater as described above.

After coating, the particles are compression molded to the desired shape using sufficient temperature and pressure to cause the matrix-forming polymer particles to fuse (i.e., thermoplastics), or otherwise bond (i.e., cross-link for thermosets), together to form a matrix which completely embeds the ferromagnetic particles therein. For thermoplastic matrix polymers, elevated temperatures will be used to melt the polymer. For thermosetting polymers flowable at room temperature (e.g. certain epoxies) no elevated temperatures are required, and room temperature molding is sufficient to cause the shells to coalesce one with the next to form the continuous matrix phase of the composite.

Figure 2:
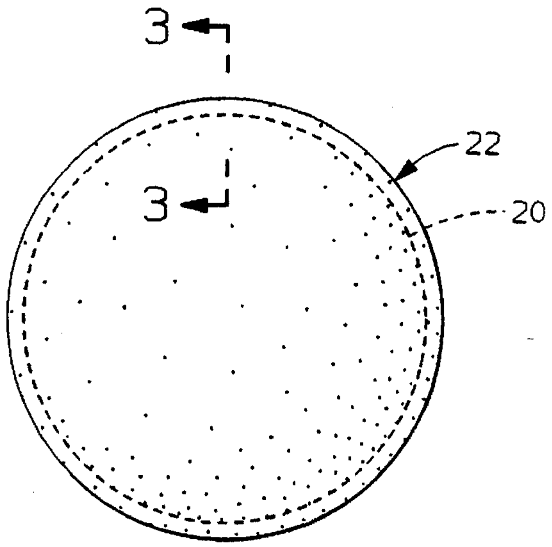
FIGS. 2 & 4 illustrate encapsulated ferromagnetic particles.
Figure 3:
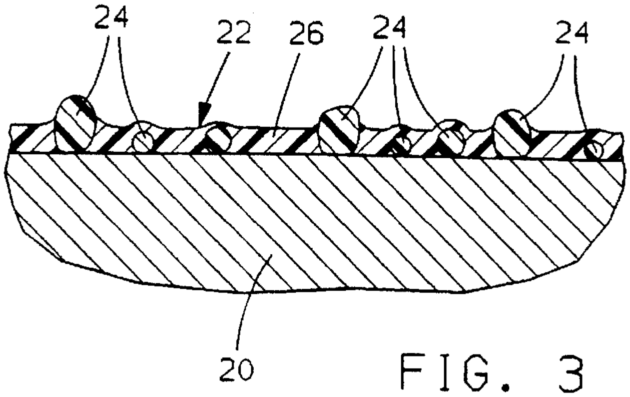
FIGS. 3 & 5 illustrate magnified portions of FIGS. 2 and 4, taken in the direction 3—3 and 5—5 respectively.

FIGS. 2 and 3 illustrate one embodiment of the present invention wherein the ferromagnetic core 20 is encapsulated in a monolayer, polymeric shell 22 having a plurality of insoluble organic lubricant particles 24 embedded in a continuous polymer film 26 and particularly on the outermost surface thereof.

Figure 4:
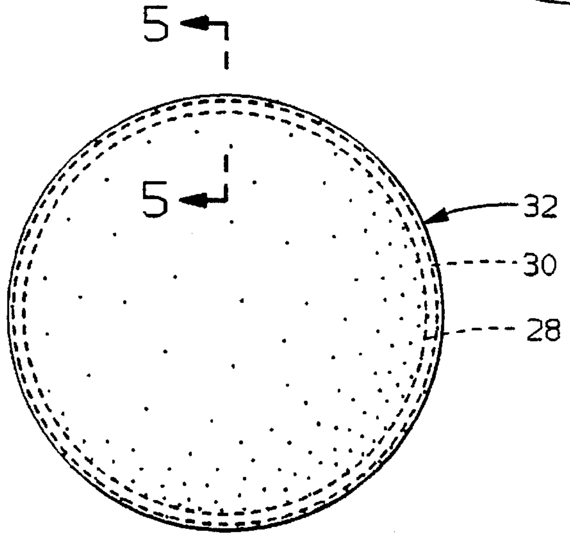
Figure 5:
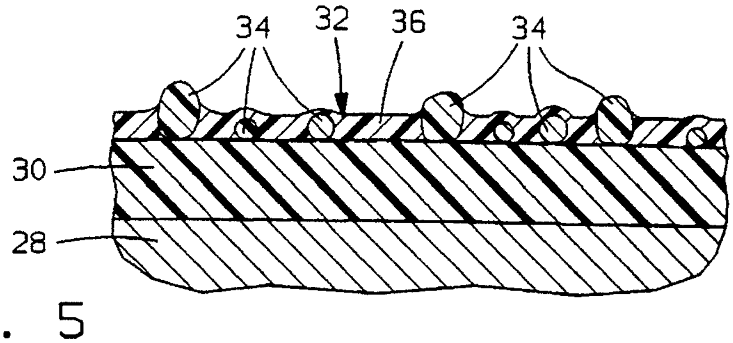

FIGS. 4 and 5 illustrate a preferred embodiment of the present invention wherein the ferromagnetic core 28 has a first lubricant-free, matrix-forming polymer underlayer 30, covered by a second binder overlayer 32 comprising a plurality of lubricant particles 34 embedded in a continuous polymer film 36.

EXAMPLE 1

In one specific example of the invention, 15 Kg of iron particles (average particles size 100 micron), identified as grade 1000C by their manufacturer (Hoeganaes Metals), were first spray-coated with a solution comprising 10% by weight polyetherimide (i.e., ULTEM 1000) and 90% by weight methylene chloride (hereafter $MeCl_2$). The thusly coated particles were then spray-coated with a slurry comprising 9% by weight ethylene bisstearateamide (i.e., ACRAWAX C), 4.5% by weight ULTEM 1000 and 86.5% by weight $MeCl_2$ in a Wurster-type coater purchased from the Glatt Corporation. The ACRAWAX C had an average particle size of about 6 microns. The coater had a seven inch (7") diameter outer vessel (i.e., at the level of the perforated floor) and a three inch (3") diameter inner cylinder which is ten inches (10") long/tall. The outer vessel widens to about 9 inches diameter through a distance of 16 inches above the floor and then becomes cylindrical. The bottom of the inner cylinder is about one half inch (½") above the floor of the coater. The fluidizing air is pumped through the perforations at a rate of about 350 $m^3$/hr. and a temperature of about 55° C. which is sufficient to preheat the iron particles and circulate them through the apparatus as described above. The ACRAWAX C slurry is air sprayed through the nozzle at a flow rate of about 40 grams/min. for 30 min. The finished shell comprised about 0.8% by weight of the encapsulated iron particles. About 0.3% by weight of the particles was made up of the outer layer. About 0.2% by weight of the encapsulated iron particles was made up of the ACRAWAX C particles. Hence 75% of the outer layer and 25% of the total shell comprised ACRAWAX.

Soft magnetic cores in the shape of a toroid were then compression molded from the thusly coated iron particles. The coated particles were loaded into a supply hopper standing offset from and above the molding press. The particles were gravity fed into an auger-type particle feeding mechanism which substantially uniformly preheats the particles to about 140° C. while they are in transit to the tooling (i.e., punch and die) which is heated to about 285° C. The preheated particles were fed into a heated feed hopper which in turn feeds the molding die via a feed shoe which shuttles back and forth between the feed hopper and the die. After the die was filled with particles, a heated punch entered the die and pressed the particles therein under a pressure of about 50 tons per square inch (TSI) so as to cause the shell to melt and to fuse to the other encapsulated iron particles and thereby form a continuous matrix for the iron particles. The pressed part was then removed from the die. Samples so made had a density of 7.35 g/cc (as compared to a theoretical density of 7.57), a magnetic permeability of 200 G/Oe, core losses of 2200 J/$m^3$, and electrical resistivity of (0.15 Ω-cm). Identical control samples processed in the same manner, but without the lubricant present, yielded a density of only 7.25 g/cc, a magnetic permeability of only 170 G/Oe core losses of 2200 J/$m^3$ and a resistivity of 0.15 Ω-cm.

EXAMPLE 2

In another example of the invention, 15 Kg of iron particles (average particle size 100 micron), identified as grade 1000C by their manufacturer (Hoeganaes Metals), were first spray-coated with a solution comprising 10% by weight polyetherimide (i.e., ULTEM 1000) and 90% by weight $MeCl_2$. The thusly coated particles were than spray-coated with a slurry comprising 7% by weight PTFE (i.e., Teflon MP 1100), 2.3% by weight methyl methacrylate-butyl methacrylate polymer (i.e., ACRYLOID B-66) and 90.7% by weight acetone in a Wurster-type coater purchased from the Glatt Corporation. The PTFE had an average particle size of about 5 microns. The coater had a seven inch (7") diameter outer vessel (i.e., at the level of the perforated floor) and a three inch (3") diameter inner cylinder which is ten inches (10") long/tall. The outer vessel widens to about 9 inches diameter through a distance of 16 inches above the floor and then becomes cylindrical. The bottom of the inner cylinder is about one half inch (½") above the floor of the coater. The fluidizing air is pumped through the perforations at a rate of about 350 $m^3$/hr. nd a temperature of about 55° C. which is sufficient to preheat the iron particles and circulate them through the apparatus as described above. The PTFE slurry is air sprayed through the nozzle 12 at a flow rate of about 40 grams/min. for 25 min. to form a shell which comprised about 0.65% by weight of the encapsulated iron particles. About 0.4% by weight of the encapsulated particles was made of the outer PTFE-acrylate layer. About 0.3% by weight of the encapsulated iron particles was made up of the PTFE particles. Hence 75% of the outer layer and 46% of the total shell comprised PTFE.

Soft magnetic cores in the shape of a toroid were then compression molded from the thusly coated iron particles. The coated particles were loaded into a supply hopper standing offset from and above the molding press. The particles were gravity fed into an auger-type particle feeding mechanism which substantially uniformly preheats the particles to about 110° C. while they are in transit to the tooling (i.e., punch and die) which is heated to about 230° C. The preheated particles were fed into a heated feed hopper which in turn feeds the molding die via a feed shoe which shuttles back and forth between the feed hopper and the die. After the die was filled with particles, a heated punch entered the die and pressed the particles therein under a pressure of about 50 TSI so as to cause the shell to melt and to fuse to the other encapsulated iron particles and thereby form a continuous matrix for the iron particles. The pressed part was then removed from the die. Samples so made had a density of 7.45 g/cc (as compared to a theoretical density of 7.69), a magnetic permeability of 350 G/Oe, core losses of about 1900–2200 J/$m^3$, and electrical resistivity of (1.1 Ω-cm). Identical control samples processed in the same manner, but without the lubricant present, yielded a density of only 7.25 g/cc, a magnetic permeability of only 170 G/Oe core losses of 2200 J/$m^3$ and a resistivity of 0.15 Ω-cm.

EXAMPLE 3

In another example of the invention, 15 Kg of Nd—B—Fe magnetic particles (average particle size 100 microns), identified as grade MQP-B by their manufacturer (General Motors Corporation), were first spray-coated with a solution comprising 10% by weight epoxy (i.e., Epoxy 164 from Shell Oil Co.) and 90% by weight acetone. The thusly-coated particles were then spray-coated with a slurry comprising 2.9% by weight ethylene bisstearateamide (i.e., ACRAWAX C), 48% by weight polystyrene and 92.3% by weight Toluene in a Wurster-type coater purchased from the Glatt Corporation. The ACRAWAX C had an average particle size of about 6 microns. The coater had a seven inch (7") diameter outer vessel (i.e., at the level of the perforated floor) and a three inch (3") diameter inner cylinder which is ten inches (10") long/tall. The outer vessel widens to about 9 inches diameter through a distance of 16 inches above the floor and then becomes cylindrical. The bottom of the inner cylinder is about one half inch (½") above the floor of the coater. The fluidizing air is pumped through the perforations at a rate of about 350 $m^3$/hr. and a temperature of about 35° C. which is sufficient to preheat the Nd—B—fe particles and circulate them through the apparatus as described above. The ACRAWAX C slurry is air sprayed through the nozzle 12 at a flow rate of about 30 grams/min. for 50 min. to form a shell which comprises about 2.3% by weight of the encapsulated Nd—B—Fe particles. About 0.8% by weight of the encapsulated particles was made up of the outer ACRAWAX-styrene layer. About 13% by weight of the total polymer shell and 37% by weight of the ACRAWAX-styrene layer comprised ACRAWAX C.

Pellets were then compression molded from the thusly coated Nd—B—fe particles. The coated particles were loaded into a supply hopper standing offset from and above the molding press. The particles were fed into a feed hopper which in turn feeds the molding die via a feed shoe which shuttles back and forth between the feed hopper and the die. After the die was filled with particles, a punch entered the die and pressed the particles therein under a pressure of about 50 TSI so as to cause the shell to fuse to the other encapsulated Nd—B—fe particles and thereby form a continuous matrix for the Nd—B—Fe particles. The pellets were then removed from the die and cured at 175° C. for 30 minutes. Samples so made had a density of 5.9 g/cc (as compared to a theoretical density of 6.9), and a residual induction (Br) of 8.13 kilogauss. Identical control samples processed in the same manner, but without the lubricant present, yielded a density of only 5.7 g/cc, and had a residual induction of 7.94 kilogauss.

EXAMPLES 4–11

Hall Flow flowability tests were conducted on several samples of the dry particles identified as Samples A–H of Table 1. The results of those appear in Table 1. According to the Hall Flow test, 50 grams of powder are placed in a calibrated aluminum funnel and allowed to flow out the bottom. The time it takes to empty the funnel is the measure of flowability, with lower numbers (i.e., fewer seconds) indicating powders with better flowability. These tests showed that particles with the lubricant bound to their surfaces according to the present invention flowed much better than (1) particles with no lubricant present, and (2) particles that were merely mechanically mixed (i.e., V-blended) with the lubricant. In fact, the V-blended samples hung up in the funnel and would not flow at all.

TABLE 1

| SAMPLE | PARTICLE | % ULTEM | % ACRYLIC | % LUBRICANT | TREATMENT | HALL FLOW SEC/50 gm |
|---|---|---|---|---|---|---|
| A | Fe | .25 | .10 | .10 PTFE | COATED[1] | 34.8 |
| B | Fe | .25 | .10 | -0- | — | 42.0 |
| C | Fe | .25 | .10 | .10 PTFE | V-BLENDED | NO FLOW |
| D | Fe | .50 | .10 | .2 ACRAWAX | COATED[1] | 28.5 |
| E | Fe | .60 | 0 | .2 ACRAWAX | V-BLENDED | 37.3 |
| | | % EPOXY | % POLYSTYRENE | | | |
| F | FeNdB | 1.5 | .5 | .5 ACRAWAX | COATED[1] | 32.9 |
| G | FeNdB | 1.5 | .5 | .5 ACRAWAX | V-BLENDED | NO FLOW |
| H[2] | FeNdB | 1.5 | .5 | -0- | — | 35–40 |

[1]- Wurster Coated
[2]- Several Samples Tested

EXAMPLE 12

A polymer solution was prepared by dissolving 0.08 g polyetherimide resin (i.e., ULTEM 1000), into 4.0 g of $MeCl_2$ in a 200-ml glass container. 15 g of a substantial pure iron particles (i.e., Hoeganaes 1000C) was stirred into the polymer solution to form a slurry. The slurry was then subjected to a mixing-and-drying process, wherein coating of the iron particles is accomplished by constant stirring and blending in the presence of blowing air followed by a subsequent atmospheric drying at about 50° C. to 80° C. for 30 min. Samples were room temperature compression molded from this material at 50 TSI. These samples were used as a standard or baseline for purposes of comparison to other samples described hereafter and yielded a resistivity of about 0.05 Ω-cm.

EXAMPLE 13

A substantially pure iron powder (Hoeganaes 1000C) was coated with a layer of Teflon embedded in a polymeric binder. More specifically, a slurry coating composition having 0.06 g of ULTEM 1000, 0.02 g of Teflon MP 1000 (having an average particles size of about 12 microns), and 4.0 g of $MeCl_2$ was prepared and mixed in a glass container with 15 g of the pure iron powder having an average particles size of about 100 microns. The $MeCl_2$ dissolves the polyetherimide, but not the Teflon particles, and upon evaporation leaves a film of ULTEM (having a mean thickness of about 1.3 microns) over each iron particle which film embeds or glues the Teflon particles to the surfaces of the iron particles. The thusly treated particles displayed a very sensible smooth, sliding feeling and when room temperature compression molded at 50 TSI yielded an electrical resistivity of about 0.20 Ω-cm, which is 4 times greater than that achieved in the lubricant-free baseline sample of Example 12.

EXAMPLE 14

An organic solution containing 0.04 g of ULTEM 1000 and 4.0 g of $MeCl_2$ was prepared and used to coat 15 g of a substantial pure iron powder (Hoeganaes 1000C) with a layer of the ULTEM. The thusly coated iron particles were then mechanically admixed with 0.4 g of a Teflon powder (MP 1000) (sans a binder) to form a mass of ULTEM-coated iron powder admixed with loose Teflon particles distributed through the mass (i.e., the Teflon is not bound to the surface of the iron particles by a polymer binder). This mixture was compression molded the same as in Example 13. Although it had the same total polymer content as the sample of Example 13, the particles of this Example 14 yielded an electrical resistivity of only about 0.06 Ω-cm. Hence the addition of Teflon particles to ULTEM coated particles alone (i.e., sans a binder) does not appear to improve interparticle electrical insulation.

EXAMPLE 15

A substantially pure iron powder is coated with a first organic layer as a base coat and then with a second organic layer containing Teflon as an overcoat. The first organic solution was prepared by dissolving 0.02 g of polystyrene (sold by Polysciences, Inc., Warrington, Pa.) in 4.0 g of methyl ethyl ketone. The polystyrene solution was used to coat the surface of 15 g of the iron powder (Hoeganaes 1000C) with polystyrene by stirring the powder in the solution until all the solvent had vaporized in the same manner as described in Example 12 for coating with ULTEM. The polystyrene-coated iron powder was then mixed (i.e., stirred in a beaker) with a slurry comprising 0.04 g of polyacyclic acid (sold by Polysciences, Inc., Warrington, Pa.) dissolved in 4.0 g of ethanol and 0.02 g of a Teflon powder (MP 1000) suspended therein to form a topcoat of acrylate-bonded Teflon on top of the polystyrene underlayer. The thusly treated particles displayed a very sensible smooth, sliding feeling and when room temperature compression molded at 50 TSI yielded a resistivity of about 0.52 Ω-cm, which is ten times greater than that obtained from the baseline sample in Example 12.

EXAMPLE 16

A slurry was prepared containing (1) 0.05 g of Teflon powder (MP 1000), and (2) 0.05 g of very-high-molecular-weight poly(methyl methacrylate) dissolved in a solvent mixture containing 2.0 g of $MeCl_2$ and 2.0 g of trichlorotrifluoroethane. This slurry was used to overcoat a 15 g batch of iron powder (Hoeganaes 1000C) that had previously been encapsulated with 0.04-g of polyetherimide (i.e., ULTEM 1000). The thusly treated particles displayed very sensible smooth, sliding feeling, and when room temperature compression molded at 50 TSI yielded an electrical resistivity of 0.91 Ω-cm.

EXAMPLE 17

A slurry was prepared comprising 0.06 g of a low-molecular-weight poly(methyl methacrylate) (sold by Polysciences, Inc., Warrington, Pa.) dissolved in 3.0 g of methyl ethyl ketone and containing 0.06 g of Teflon powder (MP 1000) suspended therein. This slurry was used to overcoat a 15.0 g batch of iron particles that had previously been encapsulated with 0.75% ULTEM 1000. The particles were room temperature compression molded at 50 TSI, and annealed at 230° C. for 30 min. The electrical resistivity of the final produce was 8.65 Ω-cm, which is about 250 times (250×) electrical resistivity obtained from Fe particles coated only with 0.75% ULTEM 1000.

EXAMPLE 18

A sample prepared as set forth in Example 16 was annealed in air at 230° C. for 30 min. The annealing process almost doubled the electrical resistivity of the sample from 0.91 Ω-cm to 1.80 Ω-cm. This and the previous Example 17 show that further improvements in electrical resistivity is further attainable if the compressed products are annealed. Annealing temperatures in a range of about 50° to about 500° C. are useful. Preferably, the annealing temperature will be from 100° C. to 300° C.

EXAMPLE 19

A slurry was prepared comprising 0.03 g of a low-molecular-weight poly(methyl methacrylate) (sold by Aldrich Chemical Co.) in 3.0 g of methyl ethyl ketone and containing 0.03 g of Teflon powder (MP 1000) suspended therein. This slurry was used to overcoat a 15.0 g batch of iron particles previously encapsulated with 0.25% ULTEM 1000. The thusly treated particles provided a very sensible smooth, sliding feeling and when room temperature compression molded pressure of 50 TSI yielded an electrical resistivity of 0.43 Ω-cm.

EXAMPLE 20

Samples were made in the same manner as described in Example 19 but using BN particles (i.e., from the Carborundum Co.) in lieu of the Teflon. Samples so made did not manifest a smooth sliding feeling like that observed in Example 19 and yielded an electrical resistivity of only 0.09 Ω-cm.

EXAMPLE 21

A solution was prepared by dissolving 0.06 g of poly (vinyl pyrrolidone) (sold by Polysciences, Inc., Warrington, Pa.) in 3.0 g of ethanol. This solution was used to deposit a first or undercoating of the poly(vinyl pyrrolidone) onto 15.0 g of substantially pure iron powder. A slurry was then prepared comprising 0.03 g of a low-molecular-weight poly (methyl methacrylate) dissolved in methyl ethyl ketone and containing 0.03 g of Teflon particles (MP 1000). The slurry was used to overcoat the previously coated Fe particles. The thusly treated particles displayed very sensible smooth, sliding feeling, and when room temperature compression molded 50 TSI yielded an electrical resistivity of 0.39 Ω-cm.

EXAMPLES 22–41

Several samples were prepared by spray coating Hoeganaes 1000C particles with coatings having the composition set forth in Table 2.

TABLE 2

| SAMPLE | BASE-COAT % ULTEM | TOPCOAT % B-66 | % PTFE | % ACRAWAX | TOTAL — |
|---|---|---|---|---|---|
| A | 0.2 | 0.10 | 0.05 | — | 0.35 |
| B | 0.2 | 0.15 | 0.30 | — | 0.65 |
| C | 0.2 | 0.20 | 0.20 | — | 0.60 |
| D | 0.2 | 0.25 | 0.10 | — | 0.55 |
| E | 0.25 | 0.10 | 0.30 | — | 0.65 |
| F | 0.25 | 0.15 | 0.05 | — | 0.45 |
| G | 0.25 | 0.20 | 0.10 | — | 0.55 |
| H | 0.25 | 0.25 | 0.20 | — | 0.65 |
| I | 0.3 | 0.10 | 0.20 | — | 0.60 |
| J | 0.3 | 0.15 | 0.10 | — | 0.55 |
| K | 0.3 | 0.20 | 0.05 | — | 0.55 |
| L | 0.3 | 0.25 | 0.30 | — | 0.85 |
| M | 0.35 | 0.10 | 0.10 | — | 0.55 |
| N | 0.35 | 0.15 | 0.20 | — | 0.70 |
| O | 0.35 | 0.20 | 0.30 | — | 0.85 |
| P | 0.35 | 0.25 | 0.05 | — | 0.65 |
| Q# | 0.25 | 0.10 | 0.10 | — | 0.45 |
| R# | 0.25 | 0.1 | — | — | 0.35 |
| S* | 0.75 | — | — | 0.20 | 0.95 |
| T*# | 0.25 | 0.10 | 0.10 | — | 0.45 |

#Molded at 55 TSI
*Samples were mechanically mixed (V-blended)

Some of the Samples A through T were compression molded at 450° F. and 60 tons per square inch pressure and the moldings tested for density, yield strength (using transverse rupture bars—TRB) and electrical resistivity the results are set forth in Table 3.

TABLE 3

| SAMPLE | DENSITY (TRB) (g/cc) | YIELD STRENGTH (psi) | RESISTIVITY (ohm-cm) |
|---|---|---|---|
| A | 7.629 | 8938 | 0.13 |
| B | 7.532 | 8215 | 0.26 |
| C | 7.459 | 8492 | 0.41 |
| D | 7.469 | 10260 | 0.16 |
| E | 7.527 | 6335 | 1.08 |
| F | 7.479 | 9384 | 0.43 |
| G | 7.471 | 9856 | 0.45 |
| H | 7.374 | 8440 | 0.82 |
| I | 7.524 | 6776 | 0.88 |
| J | 7.491 | 7721 | 0.82 |
| K | 7.437 | 9874 | 0.56 |
| L | 7.355 | 6588 | 0.98 |
| M | 7.454 | 7471 | 0.99 |
| N | 7.435 | 7032 | 3.78 |
| O | 7.369 | 6698 | 6.34 |
| P | 7.315 | 9470 | 1.24 |
| Q# | 7.40 | 11900 | 0.23 |
| R# | 7.36 | 13500 | 0.09 |
| S* | 7.195 | 5300 | 0.10 |
| T#* | 7.38 | 10200 | 0.18 |

#Molded at 55 TSI
*Samples were mechanically mixed (V-blended)

Some of the Samples A through T were compression molded in the form of toroids at 450° F. and 50 tons per square inch pressure and the moldings tested for (1) density (g/cc), (2) flux carrying capacity—Bmax (KiloGauss), (3) coercive loss—Hc (Oersteds), (4) total core losses—Wh (J/m$^3$), (5) maximum permeability—Umax (G/Oe), (6) eddy current losses (J/m$^3$), and (7) effective permeability/core loss. The results are set forth in Table 4.

TABLE 4

| Sample | (1) Density (g/cc) | (2) Bmax* (KG) | (3) Hc* (Oe) | (4) Wh* (J/m$^3$) | (5) Umax* (G/Oe) | (6) Eddy Losses* (J/m$^3$) |
|---|---|---|---|---|---|---|
| A | 7.413 | 15.74 | 4.89 | 2250 | 422 | 157 |
| B | 7.451 | 15.73 | 4.85 | 2348 | 436 | 96 |
| C | 7.464 | 15.17 | 4.89 | 2184 | 392 | 127 |
| D | 7.436 | 14.91 | 4.99 | 2186 | 372 | 100 |
| E | 7.447 | 15.15 | 4.99 | 2206 | 326 | 91 |
| F | 7.403 | 14.99 | 4.97 | 2229 | 301 | 54 |
| G | 7.421 | 14.38 | 4.94 | 2077 | 284 | 69 |
| H | 7.425 | 15.47 | 5.06 | 2217 | 293 | 99 |
| I | 7.393 | 14.23 | 4.89 | 2050 | 292 | 103 |
| J | 7.396 | 14.79 | 4.95 | 2154 | 323 | 95 |
| K | 7.394 | 14.99 | 4.88 | 2133 | 319 | 106 |
| L | 7.338 | 13.61 | 4.93 | 1963 | 267 | 49 |
| M | 7.417 | 14.62 | 5.01 | 2208 | 303 | — |
| N | 7.408 | 14.76 | 4.9 | 2240 | 311 | — |
| O | 7.347 | 14.02 | 4.96 | 2182 | 275 | — |
| P | 7.358 | 13.67 | 4.97 | 2011 | 256 | — |
| Q | — | — | — | — | — | — |
| R | — | — | — | — | — | — |
| S | 7.175 | 13.14 | 5.34 | 2012 | 190 | 175 |
| T | — | — | — | — | — | — |

*at 50 Hz/150 Oe field

In evaluating the data in Table 4 consider that: [a] for density (1), higher values are better; [b] for Bmax (2), higher values are better; [c] for Hc (3), lower values are better; [d] for Wh (4), lower values are better; [e] for Umax (5), higher values are better; and [f] for eddy losses (6), lower values are better.

Finally, some of Samples A through T were room temperature compression molded at 50 tons per square inch and yielded the resistivities set forth in Table 5.

TABLE 5

| Sample | Resistivity Ohm-cm | Sample | Resistivity Ohm-cm | Sample | Resistivity Ohm-cm |
|---|---|---|---|---|---|
| A | 0.18 | H | 0.45 | N | 0.95 |
| B | 0.14 | I | 0.35 | O | 1.21 |
| C | 0.17 | J | 0.35 | P | 1.3 |
| D | 0.15 | K | 0.61 | | |
| E | 0,43 | L | 0.69 | | |
| F | 0.39 | M | 0.69 | | |
| G | 0.49 | | | | |

In general, testing has indicated that: (1) organic lubricant particles, and particular PTFE particles, glued to the surfaces of ferromagnetic particles are important for improving dry flowability of the particles and obtaining excellent density, resistivity and magnetics; (2) ferromagnetic particles spray-coated with such lubricant particles perform better than V-blended lubricant particles; (3) PTFE did not significantly affect the density of room temperature compression molded samples; and (4) two layer shells are better than one layer shells particularly if the top layer has a lower melt flow than the underlayer.

While the invention has been disclosed in terms of a specific embodiments thereof it is not intended to be limited thereto but rather only to the extent set forth hereafter in the claims which follow.

The embodiments of the invention in which an exclusive property or privilege is claimed are defined as follows:

1. A mass of moldable particles for compression molding into a magnetizable product which comprises a plurality of ferromagnetic particles dispersed uniformly throughout a polymeric matrix, said moldable particles each comprising a ferromagnetic particle having a lubricous shell thereabout encapsulating said ferromagnetic particle, said shell comprising a minority amount of a plurality of organic lubricant particles which are smaller than said ferromagnetic particles and are bonded to said ferromagnetic particle by a film of thermoplastic binder embedding said lubricant particles and deposited onto said ferromagnetic particles from a solution of said binder in a suitable solvent which is substantially a nonsolvent for said lubricant.

2. A mass of moldable particles according to claim 1 wherein said lubricant particles are selected from the group consisting of ethylene bisstearateamide and lubricous stearates and fluorocarbons.

3. A mass of moldable particles according to claim 2 wherein said ferromagnetic particles comprise a rare-earth-metal hard magnetic material.

4. A mass of moldable particles according to claim 3 wherein said lubricant particles comprise a stearate.

5. A mass of particles according to claim 3 wherein said rare earth metal comprises neodymium, and said lubricant particles comprise ethylene bisstearateamide.

6. A mass of particles according to claim 2 wherein said ferromagnetic particles comprise a soft magnetic material and said lubricant particles comprise a fluorocarbon.

7. A mass of particles according to claim 6 wherein said fluorocarbon comprises polytetrafluoroethylene.

8. A mass of particles according to claim 6 wherein said shell comprises at least two polymeric layers including an underlayer adjacent the ferromagnetic particle which is substantially free of lubricant particles and an overlayer atop the underlayer which comprises said binder and fluorocarbon particles.

9. A mass of particles according to claim 8 wherein said underlayer comprises a polymer which is different than the polymer of said overlayer.

10. A mass of particles according to claim 9 wherein said underlayer comprises polyetherimide and said overlayer comprises an acrylate.

11. A mass of particles according to claim 10 wherein said acrylate comprises methyl methacrylate-butyl methacrylate.

12. A mass of particles according to claim 10 wherein said fluorocarbon comprises polytetrafluoroethylene.

13. A mass of particles according to claim 7 wherein said polytetrafluoroethylene particles comprise about 0.05% by weight to about 0.5% by weight of said encapsulated ferromagnetic particles.

14. A mass of particles according to claim 13 wherein said polytetrafluoroethylene particles comprise about 0.1% by weight to about 0.3% by weight of said encapsulated ferromagnetic particles.

15. A mass of particles according to claim 2 wherein said shell comprises about 0.25% to about 4.25% by weight of a moldable particle.

16. A mass of particles according to claim 2 wherein said ferromagnetic particles comprise a soft magnetic material, and said binder is selected from the group consisting of polyetherimides, polyamideimides, polysulfones, polycarbonates, polyphenylene ethers, polyphenylene oxide, polyacyclic acid, polyvinylpyrrolidone, polystyrene maleic anhydride, polystyrene, silicones and polyacrylates.

17. A mass of particles according to claim 16 wherein said lubricant particles comprise polytetrafluoroethylene and said binder is a polyacrylate comprising methyl methacrylate-butyl methacrylate.

18. A mass of particles according to claim 1 wherein said shell comprises about 0.25% to about 4.25% by weight of a moldable particle.

19. A mass of particles according to claim 18 wherein said lubricant particles comprise about 8% to about 20% by weight of said shell.

20. A mass of particles according to claim 1 wherein said ferromagnetic particles comprise a hard magnetic material, said polymeric matrix is selected from the group consisting of polyamides, epoxies and polyvinylidine fluoride, and said binder is selected from the group consisting of polystyrene, polycarbonate, polysulfone, and polyacrylates.

21. A mass of particles according to claim 1 wherein said ferromagnetic particles comprise a soft magnetic material, said polymer matrix is selected from the group consisting of thermoplastic polyetherimides, polyamideimides, polysulfones, polycarbonates, polyphenylene ethers, polyphenylene oxide, polyacyclic acid, polyvinylpyrrolidone and polystyrene maleic anhydride and said binder is selected from the group consisting of thermoplastic polyetherimides, polyamideimides, polysulfones, polycarbonates, polyphenylene ether, polyphenylene oxide, polyacyclic acid, polyvinylpyrrolidone, polystyrene maleic anhydride, silicones, polystyrene and polyacrylates.

22. A mass of particles according to claim 21 wherein said polymer matrix comprises polyetherimides, said lubricant particles comprise a fluorocarbon and said binder comprises a polyacrylate.

23. A mass of particles according to claim 22 wherein said polymer matrix comprises polyetherimide, said lubricant particles comprise polytetrafluoroethylene and said binder comprises methyl methacrylate-butyl methacrylate.

24. A mass of particles according to claim 1 wherein said shell comprises at least two polymeric layers including an underlayer adjacent the ferromagnetic particle which is substantially free of lubricant particles and an overlayer atop the underlayer which comprises said binder and lubricant particles.

25. A mass of particles according to claim 24 wherein said overlayer has a lower melt flow temperature than said underlayer.

* * * * *